United States Patent
Schade

(10) Patent No.: US 9,722,267 B2
(45) Date of Patent: *Aug. 1, 2017

(54) MODULE LEVEL REDUNDANCY FOR FUEL CELL SYSTEMS

(71) Applicant: Google Inc., Mountain View, CA (US)

(72) Inventor: Allen Wayne Schade, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/744,271

(22) Filed: Jun. 19, 2015

(65) Prior Publication Data

US 2015/0288015 A1 Oct. 8, 2015

Related U.S. Application Data

(63) Continuation of application No. 14/177,160, filed on Feb. 10, 2014, now Pat. No. 9,070,918, which is a
(Continued)

(51) Int. Cl.
*H01M 8/04746* (2016.01)
*H01M 8/04992* (2016.01)
(Continued)

(52) U.S. Cl.
CPC ..... *H01M 8/04753* (2013.01); *H01M 8/0432* (2013.01); *H01M 8/0438* (2013.01); *H01M 8/04365* (2013.01); *H01M 8/04388* (2013.01); *H01M 8/04395* (2013.01); *H01M 8/04611* (2013.01); *H01M 8/04619* (2013.01); *H01M 8/04992* (2013.01); *H01M 8/1246* (2013.01); *H01M 8/24* (2013.01); *H01M 8/249* (2013.01);
(Continued)

(58) Field of Classification Search
None
See application file for complete search history.

(56) References Cited

U.S. PATENT DOCUMENTS

| 5,595,833 A | 1/1997 | Gardner |
| 8,679,698 B2 | 3/2014 | Schade |

(Continued)

FOREIGN PATENT DOCUMENTS

JP 2009043520 A 2/2009

OTHER PUBLICATIONS

'Solid Oxide Fuel Cells.' http://www.bloomenergy.com/fuel-cell/solid-oxide/. Last accessed Jul. 13, 2012.
(Continued)

*Primary Examiner* — Patrick Ryan
*Assistant Examiner* — Carmen Lyles-Irving
(74) *Attorney, Agent, or Firm* — Fish & Richardson P.C.

(57) ABSTRACT

This disclosure relates to module level redundancy for fuel cell systems. A monitoring component monitors a set of operational parameters for a fuel cell group. The fuel cell group includes a set of fuel cell units, each having a set of fuel cell stacks. The fuel cell stacks include a set of gas powered fuel cells that convert air and fuel into electricity using a chemical reaction. The monitoring component determines that the set of operational parameters do not satisfy a set of operational criteria, and, in response, a load balancing component adjusts the electrical output capacity of the set of fuel cell units included in the fuel cell group.

21 Claims, 11 Drawing Sheets

Related U.S. Application Data continuation of application No. 13/546,992, filed on Jul. 11, 2012, now Pat. No. 8,679,698.

(51) Int. Cl.
    *H01M 8/249*     (2016.01)
    *H01M 8/0432*     (2016.01)
    *H01M 8/0438*     (2016.01)
    *H01M 8/04537*     (2016.01)
    *H01M 8/1246*     (2016.01)
    *H01M 8/24*     (2016.01)
    *H01M 8/124*     (2016.01)

(52) U.S. Cl.
    CPC   *H01M 2008/1293* (2013.01); *H01M 2250/30* (2013.01); *H01M 2300/0071* (2013.01); *Y02B 90/18* (2013.01); *Y02E 60/50* (2013.01); *Y02E 60/525* (2013.01)

(56) References Cited

U.S. PATENT DOCUMENTS

2005/0164048 A1   7/2005   Wheat
2008/0138677 A1   6/2008   Edlund

OTHER PUBLICATIONS

International Search Report and Written Opinion for International Patent Application Serial No. PCT/US13/49986, dated Oct. 10, 2013, 11 pages.
Office Action for U.S. Appl. No. 13/546,992, dated May 9, 2013, 19 pages.
Notice of Allowance for U.S. Appl. No. 13/546,992, dated Nov. 5, 2013, 21 pages.
International Preliminary Report on Patentability for International Application No. PCT/US2013/049986, mailed Jan. 13, 2015, 8 pages.

MODULE LEVEL REDUNDANCY FOR FUEL CELL SYSTEMS

CROSS REFERENCE TO RELATED APPLICATIONS

This application is a continuation of U.S. patent application Ser. No. 14/177,160, now U.S. Pat. No. 9,070,918, filed Feb. 10, 2014, titled "MODULE LEVEL REDUNDANCY FOR FUEL CELL SYSTEMS," which is a continuation of U.S. patent application Ser. No. 13/546,992, now U.S. Pat. No. 8,679,698, filed Jul. 11, 2012, titled "MODULE LEVEL REDUNDANCY FOR FUEL CELL SYSTEMS". The disclosure of the foregoing applications are incorporated herein by reference in their entirety for all purposes.

TECHNICAL FIELD

This disclosure generally relates to systems and methods that facilitate module level redundancy for fuel cell systems.

BACKGROUND

People currently have greater access to information and person-to-person connectivity than ever before. Advances in computing technology and the internet are continually changing the ways that people access and share information. Millions of people have the capability to generate content, such as articles, songs, videos, etc. that can be shared with people across the globe in almost real-time. In addition, the rapid growth of mobile communication devices, such as smart phones and tablet computers, enable people to enjoy these services from anywhere in the world.

As the number of countries and people participating in the digital revolution increases, so does the demand for energy to power the devices and technology. Experts predict that in the coming decades global energy consumption may more than double. Cost associated with powering servers and other devices that form the backbone of on-line services represent a major expense for operators. In addition, consumers expect on-line services and products to be continuously available. As a result, it is critical for operators to have access to substantial amounts of reliable and affordable energy.

Typically, operators have limited options for powering servers and associated equipment. Power is obtained from a local energy provider, and operators attempt to mitigate energy consumption cost by employing energy efficient equipment. Recently, new developments in fuel cell technology have generated promising developments for reducing energy cost for large scale consumers. However, fuel cells require a well maintained infrastructure. Potential infrastructure failures and associated maintenance requirements can result in undesirable down-time for many operators.

SUMMARY

The following presents a simplified summary of the specification in order to provide a basic understanding of some aspects of the specification. This summary is not an extensive overview of the specification. It is intended to neither identify key or critical elements of the specification nor delineate any scope of particular implementations of the specification, or any scope of the claims. Its sole purpose is to present some concepts of the specification in a simplified form as a prelude to the more detailed description that is presented later.

According to an aspect of the subject innovation, systems and methods for module level redundancy for fuel cell systems are disclosed. In one implementation, a monitoring component monitors a set of operational parameters for a fuel cell group. The fuel cell group includes a set of fuel cell units, each having a set of fuel cell stacks. The fuel cell stacks include a set of gas powered fuel cells that convert air and fuel into electricity using a chemical reaction. In one implementation, a monitoring component monitors a set of operational parameters for a fuel cell group, and determines that the operational parameters do not satisfy a set of operational criteria, and in response to the determination that the set of operational parameters do not satisfy the set of operational criteria, a load balancing component adjusts the electrical output capacity of a set of fuel cell units included in the fuel cell group.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
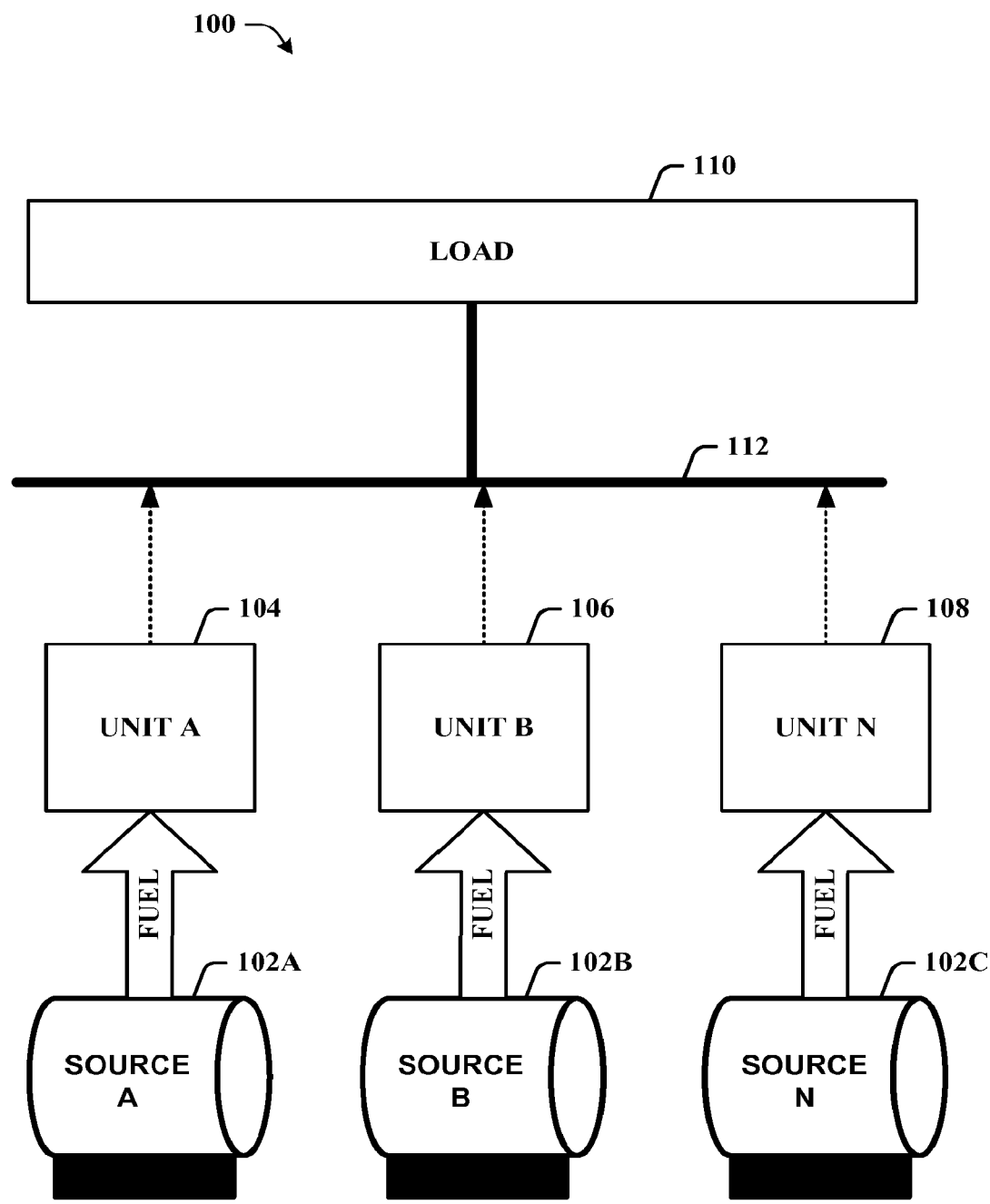
FIG. 1 illustrates a non-limiting example of a system for module level redundancy for fuel cell systems in accordance with various aspects described in this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

As noted in the Background section, fuel cells require a well maintained infrastructure. Potential infrastructure failures, and associated maintenance requirements can result in undesirable down-time for many operators. In accordance with an implementation, a monitoring component monitors a set of operational parameters for a fuel cell group, and determines that the operational parameters do not satisfy a set of operational criteria, and in response to the determination that the set of operational parameters do not satisfy the set of operational criteria, a load balancing component adjusts the output capacity of a set of fuel cell units included in the fuel cell group.

Non-Limiting Examples of Module Level Redundancy for Fuel Cell Systems

Turning now to FIG. 1, illustrated is a non-limiting example of a system 100 for module level redundancy for fuel cell systems in accordance with various aspects described in this disclosure. The system 100 includes a set of fuel sources 102, including, e.g., in FIG. 1 a first fuel source 102A, a second fuel source 102B, and an $N^{th}$ fuel source 102C, where N is an integer. The fuel sources 102A-C (sources 102A-C) supply, deliver, or otherwise provide fuel to an associated fuel cell unit (unit). For example, the first source 102A provides fuel to a first unit 104, the second source 102B provides fuel to a second unit 106, and the $N^{th}$ source 102C provides fuel to an $N^{th}$ unit 108. The fuel can include but is not limited to natural gas, compressed natural gas (CNG), and/or liquid natural gas (LNG). For instance, the first source 102A can include fuel provided by a utility provider, the second source 102B can include CNG maintained in a storage tank, and the $N^{th}$ source 102C can include LNG maintained in a storage tank.

The fuel cell units 104-108 each include a set of fuel cell stacks (e.g., six stacks per unit), and each of the fuel cell stacks includes a set of fuel cells (e.g., 1000 fuel cells per stack) (discussed in greater detail with reference to FIG. 2). The fuel cells can include but are not limited to gas powered fuel cells. For example, in one implementation, the fuel cells include solid oxide fuel cells. Gas powered fuel cells convert fuel and air into electricity using an electro-chemical reaction. The quantity of fuel cells included in the fuel cell stacks, and/or the quantity of fuel cell stacks included in a unit (e.g., unit 104-108) can be a function of a desired rate of conversion to electrical energy (e.g., desired Wattage or Watts) to be generated by the units 104-108. For example, each fuel cell can generate 33 watts. Each fuel cell stack aggregates or combines the electrical energy generated by the individual fuel cells included the stack, and produces a fuel cell stack output of about 33 kW (e.g., 33 watts×1000 cells), and the units combine the energy output from each stack to produce a unit output of about 200 kW (e.g., 33 kW×6 stacks).

The fuel cell units 104-108 communally provide electrical energy to a load 110 via a common power bus 112 (bus 112). Providing separate sources 102A-C for each of the units 104-108 segregates, insulates, or otherwise compartmentalizes the units 104-108, and enables uninterrupted service to the load 110 in the event of a disruption of fuel from a source 102A-C, a unit 104-108 being taken offline for maintenance, and/or unit 104-108 experiencing a malfunction. The units 104-108 operate at an optimal efficiency when provided with a predetermined amount of fuel and/or air (e.g., optimal fuel-air setting). For example, the units 104-108 can each produce 200 kW of electricity at the optimal fuel-air setting.

Modifying, altering or otherwise adjusting the fuel and/or air provided to a unit 104-108 can increase (or decrease) the electrical output capacity of the unit 104-108. In addition, adjusting the fuel and/or air provided to the unit 104-108 can cause the unit 104-108 to operate at a lower efficiency. For instance, increasing the fuel provided to the unit 104 may increase the output capacity of the unit 104 from 200 kW to 230 kW; however, the amount of heat generated by the fuel cells included in the unit 104, and/or the amount of fuel that experiences a less than optimal conversion may increase.

It may be desirable to operate one or more of the units 104-108 at a higher output capacity (and lower efficiency) to compensate for another unit. For instance, if unit 108 goes offline (e.g., is taken down for maintenance, or losses a set of cells or a stack), then the output capacity of the remaining fuel cell units (e.g., units 104 and 106) can be increased to compensate for the loss of the output capacity of fuel cell unit 108 by adjusting the fuel and/or air provided to the remaining fuel cell units. Increasing the output of the remaining fuel cell units may enable continued operation of the load 110, until the unit 108 can be repaired or brought back online. For example, if the load 110 includes a set of network servers, then an operator may desire to have the set of network servers continuously operating without interruption.

Figure 2:
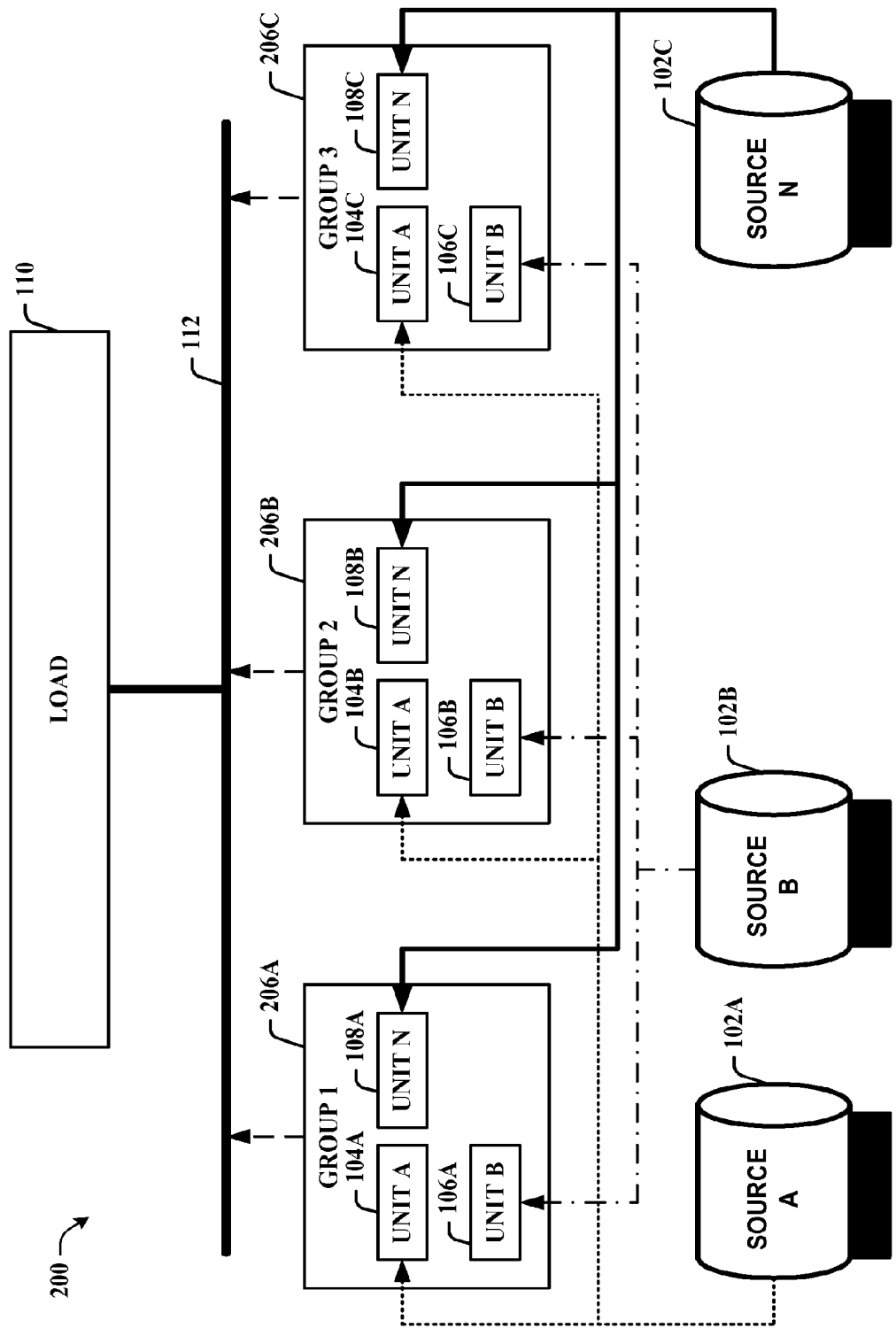
FIG. 2 illustrates a non-limiting example of a system for module level redundancy for fuel cell systems in accordance with various aspects described in this disclosure.

FIG. 2 illustrates a non-limiting example of a system 200 for module level redundancy for fuel cell systems in accordance with various aspects described in this disclosure. The system 200 includes a set of fuel sources, including, e.g., in FIG. 2, a first fuel source 102A, a second fuel source 102B, a Nth fuel source 102C, where N is an integer. The fuel sources 102A-C (sources 102A-C) provide fuel to a set of associated fuel cell units 104-108 (units 104-108). For example, the first source 102A provides fuel to a first set of units 104A-C (e.g., Unit A), the second source 102B provides fuel to a second set of units 106A-C (e.g., Unit B), and the $N^{th}$ source 102C provides fuel to a $N^{th}$ set of units 108A-C (e.g., Unit N).

The units are arranged, organized, or otherwise grouped into a set of groups 206A-C. Each of the groups 206A-C includes one unit from each of the sets of units 104-108. For example, a first group 206A includes a first unit 104A (e.g., Unit A) in the first set of units, a first unit 106A (e.g., Unit B) in the second set of units, and a first unit 108A (e.g., Unit N) in the $N^{th}$ set of units. Each group 206 aggregates or combines electrical energy produced by respective units included in the group 206, and communally provides the electrical energy to a load 110 via a common bus 112.

As discussed, providing separate sources 102A-C for each of the sets of units 104-108 compartmentalizes the sets of units 104-108, and enables uninterrupted service to the load 110 in the event of a disruption of fuel from a source 102A-C, and/or an offline unit 104-108. For example, if the first fuel source 102A experiences a malfunction, then each unit 104A-C (e.g., Unit A) included in the first set of units 104 may go offline. In response to the first set of units 104A-C going offline, the output capacity of the remaining units 106-108 in each group 206A-C can be increased to compensate for the units 104A-C. For instance, the output capacity of the remaining units 106-108 can be increased by adjusting the fuel and/or air provided to the units 106-108. Increasing the output capacity of the units 106-108 may enable continued operation of the load 110, until the source 102A can be repaired and/or brought back online. For example, if the load 110 includes a hospital, then it may be necessary for the hospital to have power continuously without interruption. Aspects of the invention are not limited to a quantity of groups. For example, there can be X groups, where X is an integer.

Figure 3:
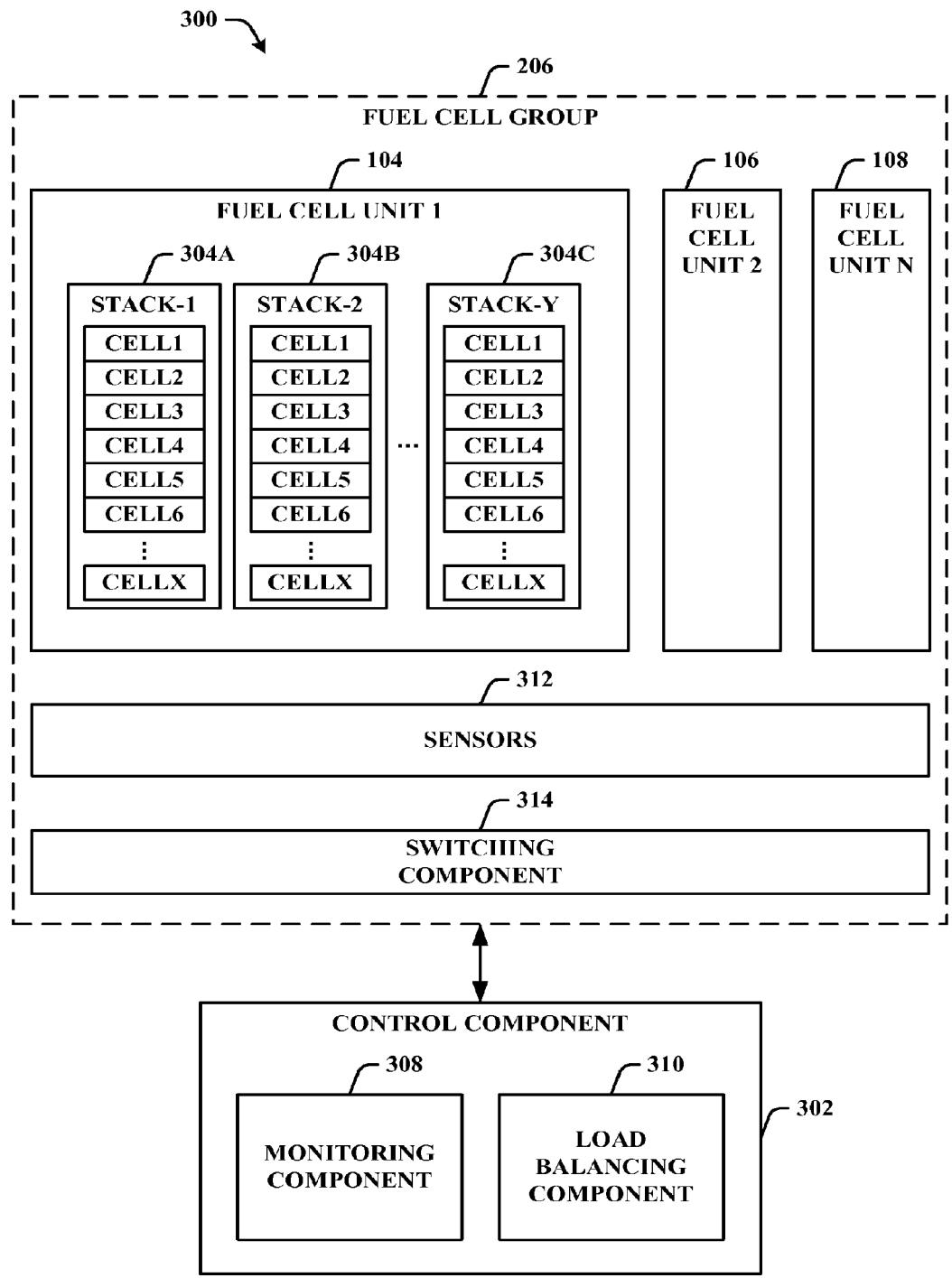
FIG. 3 illustrates an example system for module level redundancy for fuel cell systems in accordance with various aspects described in this disclosure.

Turning now to FIG. 3, illustrated is an example system 300 for module level redundancy for fuel cell systems in accordance with various aspects described in this disclosure. Generally, system 300 can include a memory that stores computer executable components and a processor that executes computer executable components stored in the memory, examples of which can be found with reference to FIG. 11. The system 300 includes a control component 302, and a fuel cell group 206. The control component 302 manages, instructs, or otherwise controls aspects of electricity generation by a set of fuel cell units 104-108 included in the fuel cell group 206. The control component 302 includes a monitoring component 308, and a load balancing component 310.

The monitoring component 308 examines, detects, or otherwise monitors a set of operational parameters for the fuel cell group 206. For example, in one implementation, the monitoring component 308 obtains, acquires, or otherwise receives a set of data regarding the operational parameters from a set of sensors 312 included in, or associated with, the fuel cell group 206. The operational parameters can include but are not limited to an electrical output capacity (e.g., Watts) of the fuel cell group 206, an electrical output capacity of a fuel cell unit 104-108, an electrical output capacity of a fuel cell stack 304, and/or an electrical output capacity of a fuel cell. The operational parameters can further include but are not limited to data regarding air flow to respective fuel cell units 104-108, data regarding fuel flow to respective units 104-108, and/or data regarding temperatures of respective fuel cell stacks 304 and/or the fuel cell units 104-108.

Additionally, the monitoring component 308 triggers a modification, an update, or an adjustment of the output capacity of one or more of the fuel cell units 104-108 based in part on the set of operational parameters (e.g., load balancing). For example, the monitoring component 308 can determine that a second fuel cell unit 106 is not operating. In response, to the second fuel cell unit 106 not operating, the monitoring component 308 can trigger an adjustment (e.g., an increase) of the output capacity of a set of remaining fuel cell units (e.g., units 104 and 108) in order to maintain the output capacity for the fuel cell group 206 (e.g., balance the output capacity between the remaining units 104 and 108).

The load balancing component 310 modifies, updates, or otherwise adjusts one or more control parameters to balance the output capacity of the fuel cell units 104-108 included in the fuel cell group 206. The control parameters can include but are not limited to an amount, or rate, of air provided to a fuel cell unit 104-108 (e.g., an air flow set-point), an amount, or rate, of fuel provided to a fuel cell unit 104-108 (e.g., a fuel flow set-point), and/or a temperature set-point for a fuel cell unit 104-108. For example, in one implementation, the load balancing component 310 can increase a fuel flow set-point for the first fuel cell unit 104 in order to increase the output capacity of the fuel cell unit 104. As discussed, the fuel cell units 104-108 operate at an optimal efficiency when provided with a predetermined amount of fuel and/or air (e.g., optimal fuel-air setting). For example, the fuel cell units 104-108 can each produce 200 kW of electricity at an optimal fuel-air setting. Increasing the fuel provided to the fuel cell unit 104 may increase the output capacity of the unit 104 from, for example, 200 kW to 230 kW.

The load balancing component 310 transmits, signals, or otherwise provides the updated control parameters to a switching component 314. The switching component 314 implements, effectuates, or otherwise executes the control parameters. For example, in one implementation, the switching component 314 can instruct a fuel cell source (e.g., source 102B) to increase an amount of fuel provided to the associated fuel cell unit 106 based on the control parameters (discussed in greater detail with regard to FIG. 6). It is to be appreciated that although the switching component 314 is illustrated as being included in the fuel cell group 206 such implementation is not so limited. For example, the switching component 314 can be included in the control component 302, and/or can be a stand-alone component.

Figure 4:
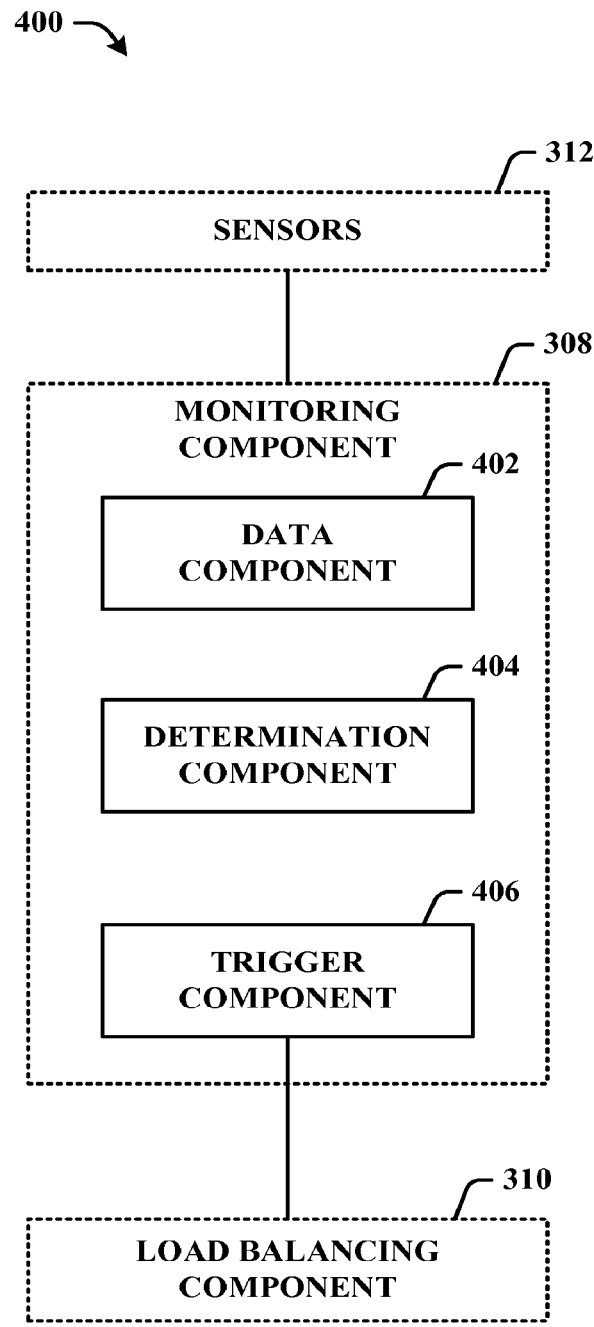
FIG. 4 illustrates an example monitoring component in accordance with various aspects described in this disclosure.

FIG. 4 illustrates an example monitoring component 308 in accordance with various aspects described in this disclosure. As discussed, the monitoring component 308 monitors a set of operational parameters for a fuel cell group (e.g., group 206). The monitoring component 308 in FIG. 4 includes a data component 402, a determination component 404, and a trigger component 406. The data component 402 obtains, acquires, or otherwise receives data regarding operational parameters from a set of sensors 312 associated with the fuel cell group. The operational parameters can include but are not limited to an electrical output (e.g., Watts) of the fuel cell group, an output of a fuel cell unit (unit), an output of a fuel cell stack (stack), and/or an output of a fuel cell (cell). The operational parameters can further include but are not limited to data regarding air flow to respective units included in the fuel cell group, data regarding fuel flow to respective units included in the fuel cell group, and/or data regarding temperature of the units and/or of respective stacks included in the units.

The determination component 404 determines whether the operational parameters satisfy a set of operational criteria. The operational criteria can include but are not limited to an output threshold (e.g., group output threshold, unit output threshold, stack output threshold, and/or cell output threshold), an air flow threshold, a fuel flow threshold, and/or a temperature threshold (e.g., unit temperature threshold, stack temperature threshold, and/or cell unit temperature threshold). For example, the determination component 404 can compare data regarding output for a unit against a fuel unit output threshold, and determine whether the output for the unit satisfies the unit output threshold based on the comparison.

The trigger component 406 generates, initiates, or otherwise triggers an update, modification, or adjustment of the output capacity of one or more of the units (e.g., units 104-108) based in part on a determination by the determination component 404 that one or more operational parameters do not satisfy the set of operational criteria. For example, if an output of a first unit (e.g., 0 watts) does not satisfy a unit output threshold (e.g., 200 watts), then the trigger component 406 can trigger an adjustment of the output capacity for a set of other units (e.g., load balancing).

Figure 5:
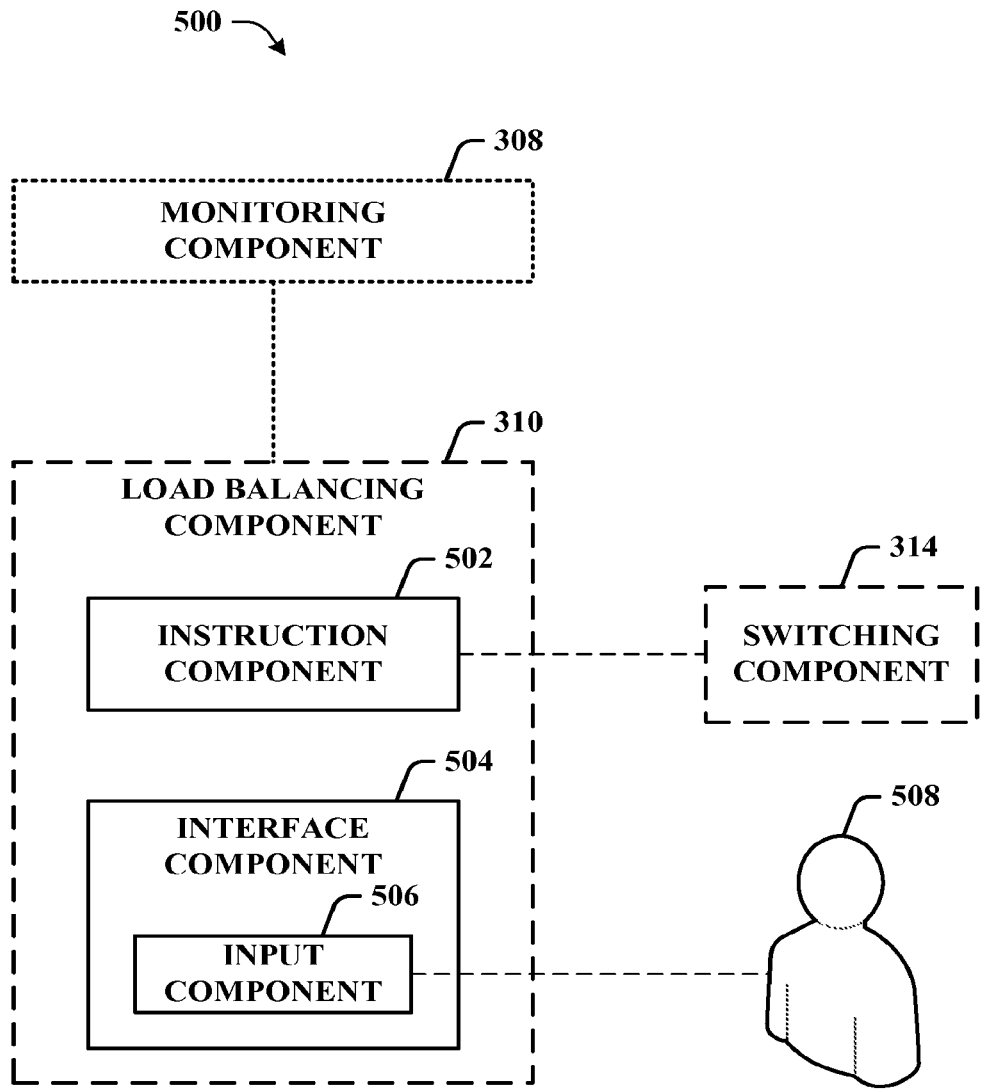
FIG. 5 illustrates an example load balancing component in accordance with various aspects described in this disclosure.

Referring to FIG. 5, illustrated is an example load balancing component 310 in accordance with various aspects described in this disclosure. As discussed, the load balancing component 310 adjusts a set of control parameters to balance the output of a set of fuel cell units (units) included in a fuel cell group (group). The control parameters can include but are not limited to a rate of air provided to a unit (e.g., air flow set-point), a rate of fuel provided to a unit (e.g., fuel flow set-point), and/or a temperature set-point for a group and/or unit. For example, a group can include six units that each produce 200 kW at an optimum air-fuel setting, for a total of 1200 kW. If a first unit goes, or is taken, offline, then the load balancing component 310 can adjusts a set of control parameters for the remaining five units to compensate for the first unit. For instance, the load balancing component 310 can increase the production or output capacity of the remaining five to 240 kW (e.g., 1200 kW total) by increasing the fuel provided to the remaining five units.

The load balancing component 310 in FIG. 5 includes an instruction component 502, and an interface component 504. The instruction component 502 transmits, signals, or otherwise provides the updated set of control parameters to a switching component 314 to execute the updated set of control parameters. For example, the load balancing component 310 can provide a temperature set-point to the switching component 314, and the switching component 314 can execute the temperature set-point by controlling one or more associated thermostats. As an additional or alternative example, in one implementation, the instruction component 502 can provide updated control parameters to associated equipment. For instance, the instruction component 502 can provide the temperature set-point to the one or more associated thermostats.

The interface component 504 provides for modification, interaction, or adjustment of control parameters by a user 508. The interface component 504 includes any suitable and/or necessary adapters, connectors, channels, communication paths, etc. to integrate the load balancing component 310 into virtually any operating and/or database system(s). Moreover, the interface component 504 can provide various adapters, connectors, channels, communication paths, etc., that provide for interaction with the system load balancing component 504. For example, the user 508 (e.g., operator, etc.) can adjust the control parameters (e.g., using a computing device) to take a fuel cell unit offline for maintenance. The interface component 504 includes an input component 506 that obtains, acquires, or otherwise receives the control parameters from the user 508. The control parameters can include explicit user inputs (e.g., configuration selections, question/answer, etc.) such as from mouse selections, keyboard selections, touch screen selections, and/or speech. Additionally or alternatively, inputs can also include data uploads, wherein a data upload is a transfer of data from the user 508 or a third party source (e.g. computer or a computer readable medium), to the input component 506.

Figure 6:
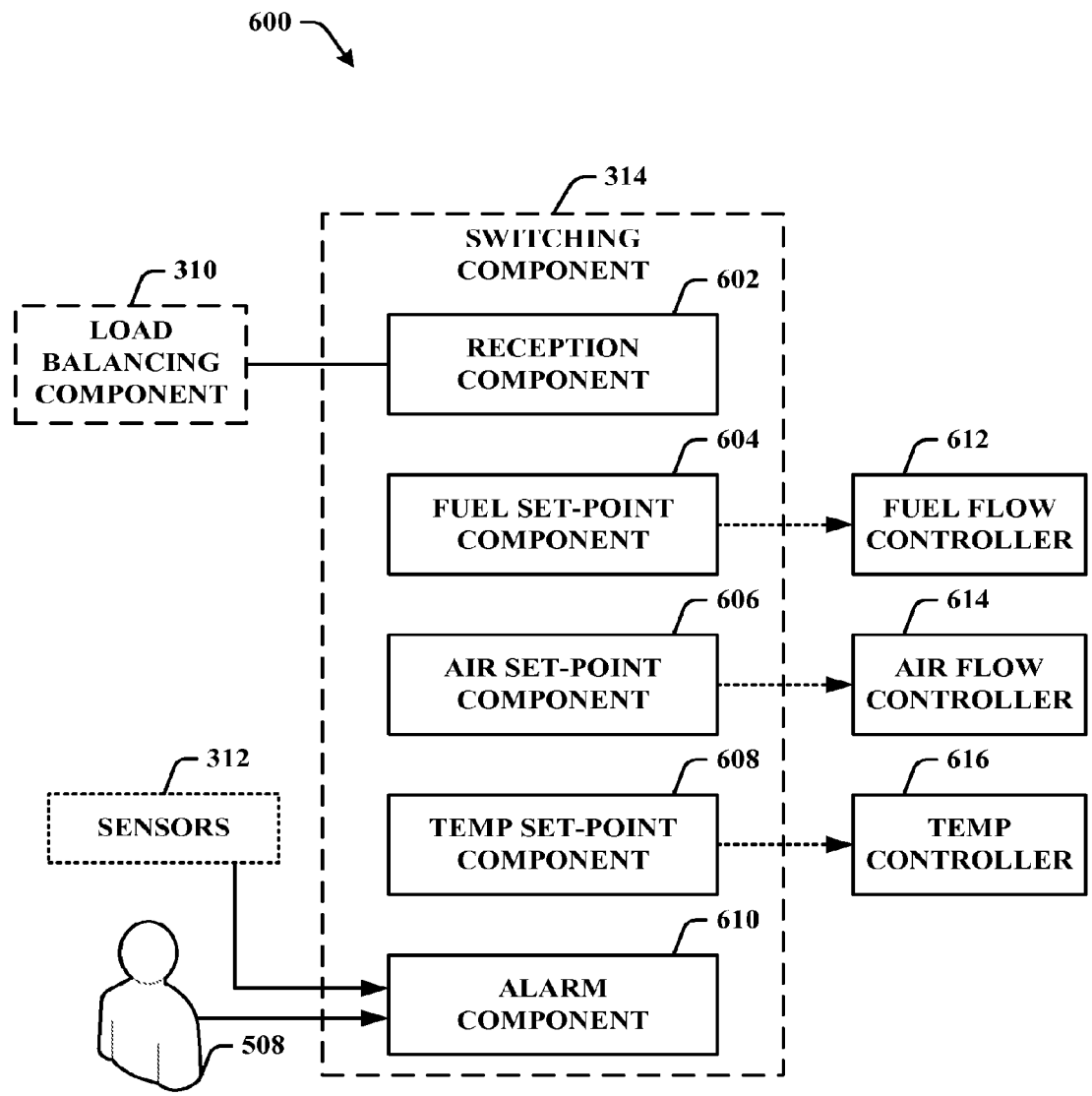
FIG. 6 illustrates an example switching component in accordance with various aspects described in this disclosure.

Turning to FIG. 6 illustrated is an example switching component 314 in accordance with various aspects described in this disclosure. The switching component 314 in FIG. 6 includes a reception component 602, a fuel flow set-point component 604, an air set-point component 606, a temperature set-point component 608, and an alarm component 610. The reception component 602 obtains, acquires, or otherwise receives a set of control parameters, for example, from a load balancing component 310. As discussed, the switching component 314 executes the set of control parameters. The control parameters can include but are not limited to a rate of air provided to a fuel cell unit (an air flow set-point), a rate of fuel provided to a fuel cell unit (a fuel flow set-point), and/or a temperature set-point for a fuel cell group and/or unit.

The fuel flow set-point component 604 instructs, manages, or otherwise controls a fuel flow controller 612 associated with a fuel flow set-point. The fuel flow controller 612 can include but is not limited to a fuel flow valve and/or fuel flow pump. For example, the reception component 602 can receive a fuel flow set-point (e.g., from the load balancing component 310) for a first fuel cell unit, and the fuel set-point component 604 can control a fuel pump (e.g., fuel flow controller 612) that regulates the flow of fuel from a fuel source to the first fuel cell unit using the fuel flow set-point.

The air set-point component 606 instructs, manages, or otherwise controls an air flow controller 614 associated with an air flow set-point. The air flow controller 614 can include but is not limited to an air flow valve and/or air flow pump. For example, the reception component 602 can receive an air flow set-point (e.g., from the load balancing component 310) for the first fuel cell unit, and the air set-point component 606 can control a valve that regulates the flow of air to the first fuel cell unit using the air flow set-point.

The temperature set-point component 608 instructs, manages, or otherwise controls a temperature controller 616 associated with a temperature set-point. The temperature controller 616 can include but is not limited to a thermostat and/or a coolant pump. For example, the reception component 602 can receive a temperature set-point (e.g., from the load balancing component 310) for the first fuel cell unit, and the temperature controller 616 can control a thermostat that regulates a temperature of the first fuel cell unit using the temperature set-point.

The alarm component 610 obtains, acquires, or otherwise receives an alarm (e.g., emergency stop command) from a set of sensors 312 associated with a fuel cell unit (e.g., unit 104-108) and/or a user 508. In addition, the alarm component 610 adjusts a set of control parameters based on the alarm. For example, in one implementation, the alarm component 610 can receive an alarm from the set of sensors 312 that a malfunction in a first fuel cell unit has occurred and/or or is occurring, and the alarm component 610 can adjust the fuel flow set-point, air-flow set-point, and/or temperature set-point for the first fuel cell unit based on the alarm. For instance, the alarm component 610, in order to shutdown the first fuel cell unit, can adjust the fuel flow set-point for the first fuel cell unit to zero or null. As an additional or alternative example, in response to noticing a dangerous situation, the user 508 can trigger an emergency shutdown. For instance, the user 508 can activate an emergency shutdown control (e.g., press a button, pull an alarm, etc.). In response to the user 508 triggering the emergency shutdown, the alarm component 610 can adjust the control parameters to shutdown the associated fuel cell unit or fuel cell group.

Figure 7:
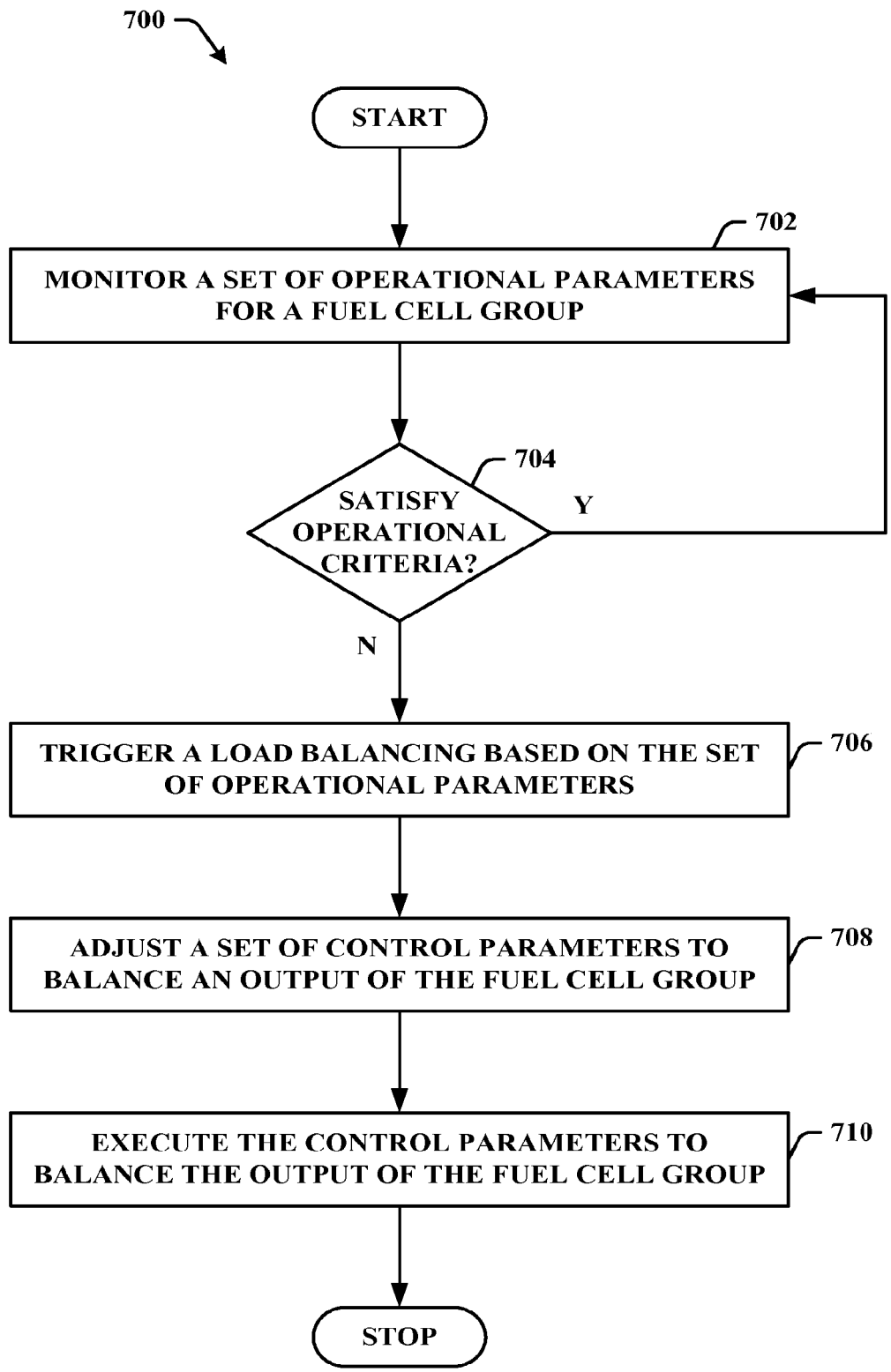
FIGS. 7-9 are example flow diagrams of respective methods for module level redundancy for fuel cell systems in accordance with various aspects described in this disclosure.
Figure 8:
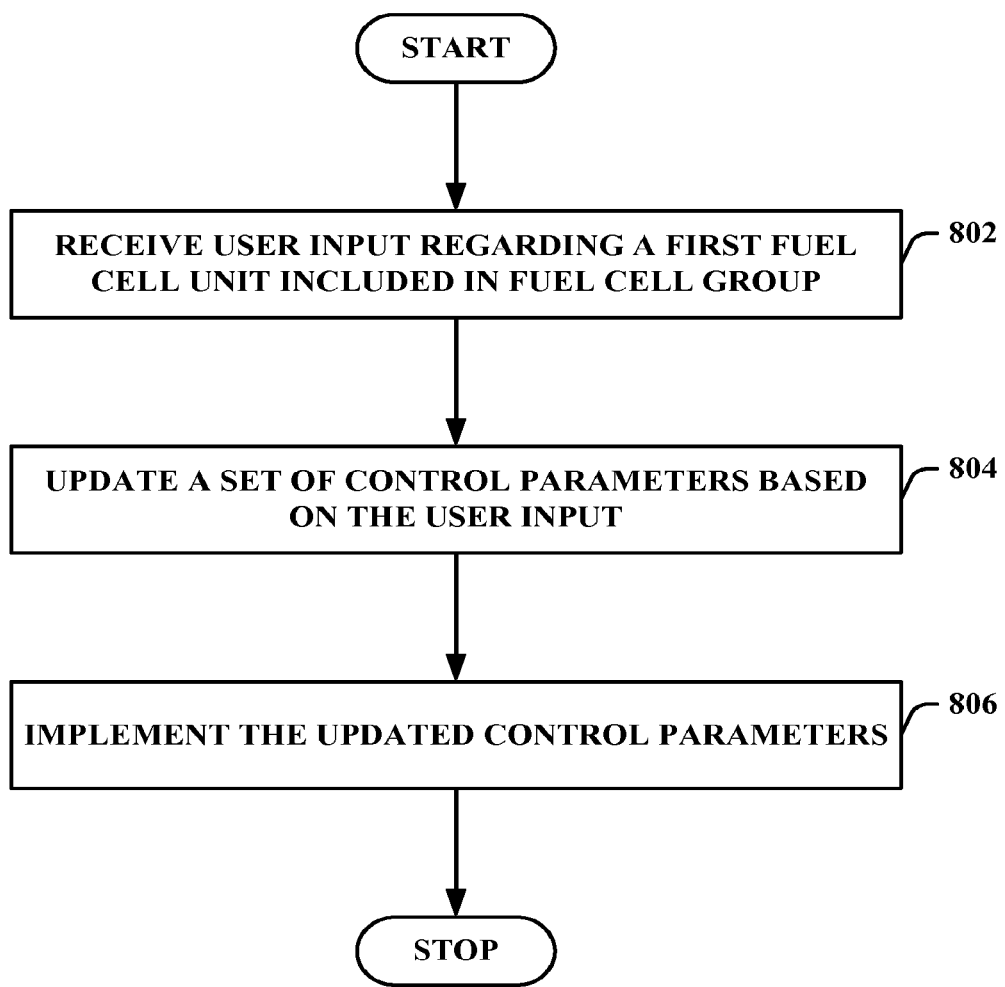
Figure 9:
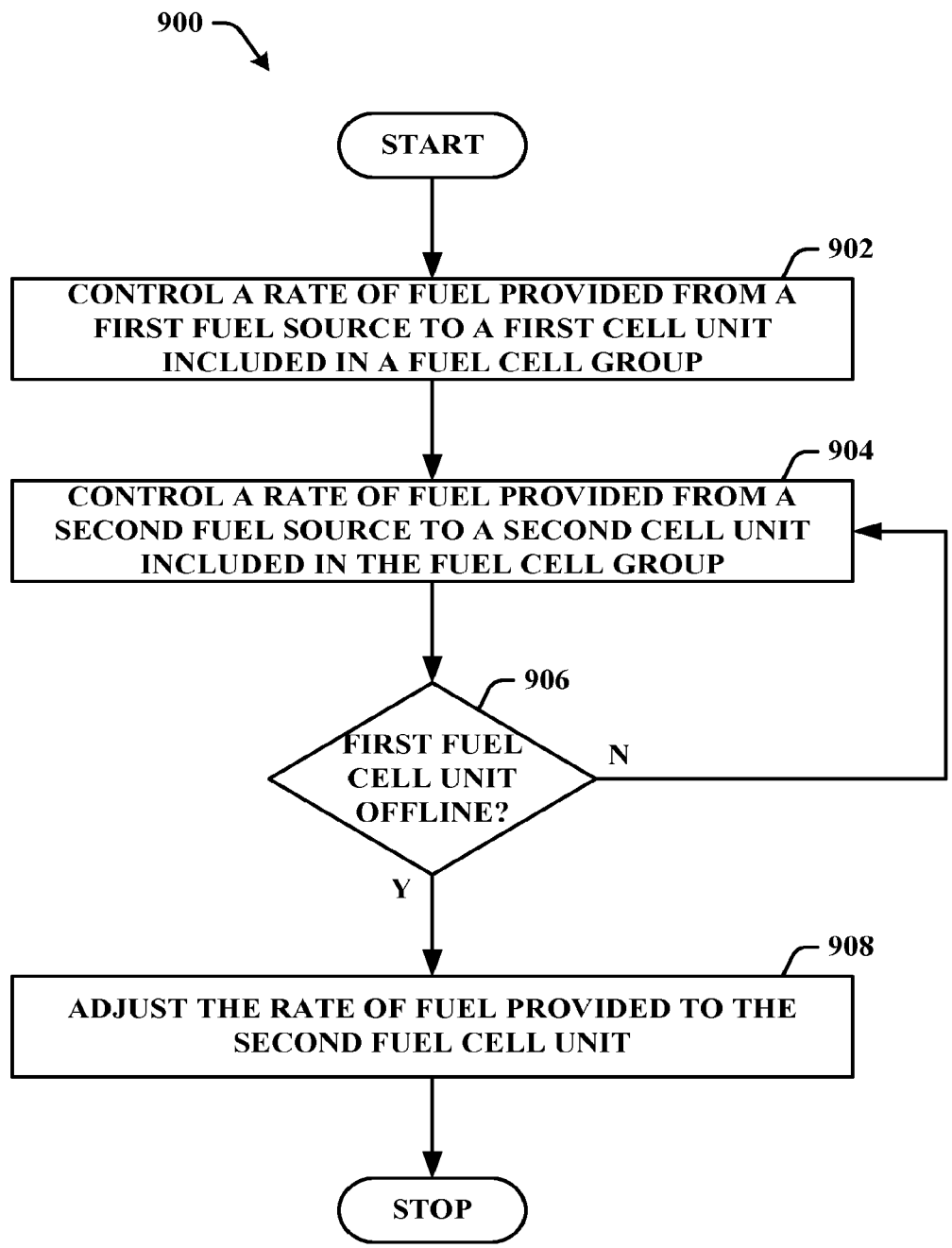

Non-Limiting Examples of Methods for Module Level Redundancy for Fuel Cell Systems FIGS. 7-9 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 7, illustrated is an example methodology 700 for module level redundancy for fuel cell systems in accordance with various aspects described in this disclosure. At reference numeral 702, a set of operational parameters for a fuel cell group are monitored (e.g., using the monitoring component 308). For example, in one implementation, a set of data regarding the set of operational parameters is received (e.g., using the data component 402) from a set of sensors (e.g., sensors 312) associated with a fuel cell group. The operational parameters can include but are not limited to an electrical output capacity (output capacity, output, or Watts) of the fuel cell group, a fuel cell unit included in the fuel cell group, a fuel cell stack included in the fuel cell unit, and/or a fuel cell included in the fuel cell stack. The operational parameters can further include data regarding air flow to respective fuel cell units, data regarding fuel flow to respective units, and/or data regarding temperatures of respective fuel cell stacks and/or fuel cell units.

At reference numeral 704, a determination is made whether the operational parameters satisfy a set of operational criteria (e.g., using the determination component 404). The operational criteria can include but are not limited to an output threshold (e.g., fuel cell group output threshold, a fuel cell unit output threshold, fuel cell stack output threshold, and/or fuel cell output threshold), an air flow threshold, a fuel flow threshold, and/or a temperature threshold (e.g., fuel cell stack temperature or fuel cell unit temperature). For example, data regarding output for a fuel cell unit can be compared against a fuel cell unit output threshold, and, based on the comparison, a determination can be made whether the output for the fuel cell unit satisfies the fuel cell unit output threshold.

At reference numeral 706, if it is determined that the set of operational parameters do not satisfy the set operational criteria (N at 704), then a load balancing is triggered (e.g., using the trigger component 406). For example, if an output capacity of a first fuel cell unit (e.g., 0 watts) does not satisfy a fuel cell unit output capacity threshold (e.g., 200 watts), then the output capacity of a set of fuel cell units included in the fuel cell group is balanced to maintain the output capacity for the fuel cell group. Returning to reference numeral 704, if it is determined that the set of operational parameters do satisfy the set of operational criteria, then the methodology returns to reference numeral 702.

At reference numeral 708, in response to a load balancing being triggered, a subset of control parameters included in a set of control parameters are updated (e.g., using the load balancing component 310) to balance the output capacity of the fuel cell units in order to maintain the output capacity of the fuel cell group. The control parameters can include but are not limited to an amount, or rate, of air provided to a fuel cell unit (e.g., an air flow set-point), an amount, or rate, of fuel provided to a fuel cell unit (e.g., a fuel flow set-point), and/or a temperature set-point for a fuel cell unit. For example, in one implementation, the amount of fuel provided to a first fuel cell unit included in a fuel cell group can be increased in order to increase the output capacity of the first fuel cell unit. As discussed, fuel cell units operate at an optimal efficiency when provided with a predetermined amount of fuel and/or air (e.g., optimal fuel-air setting). For example, each fuel cell unit in a fuel cell group can each produce 200 kW of electricity at an optimal fuel-air setting. Modifying an amount of fuel and/or air provided to a first fuel cell unit can increase the output capacity of the first fuel cell unit to, or example, 240 kW.

At reference numeral 710, the adjusted control parameters are executed (e.g., using the switching component 314) to balance the load between the fuel cell units in the fuel cell group. For example, a fuel cell source can be instructed to increase an amount of fuel provided to an associated fuel cell unit based on the control parameters. Aspects of the innovation are limited to a quantity of fuel cell groups, or fuel cell units included in the fuel cell groups. For example, in one implementation, a quantity of Y fuel cell groups, can include one fuel cell unit from each of X sets of fuel cell units, where X and Y are integers. Each of the X sets of fuel cell units can receive fuel from a separate fuel cell source (discussed in greater detail with reference to FIG. 2).

FIG. 8 illustrates an example methodology 800 for module level redundancy for fuel cell systems in accordance with various aspects described in this disclosure. At reference numeral 802, user input regarding a first fuel cell unit included in a fuel cell group is received (e.g., using the input component 506). For example, a user can provided a set of commands to take the first fuel cell unit offline for maintenance or service. The inputs can include explicit user inputs (e.g., configuration selections, question/answer, etc.) such as from mouse selections, keyboard selections, and/or speech. Additionally or alternatively, the inputs can also include data uploads, wherein a data upload is a transfer of data from the user or a third party source (e.g. computer or a computer readable medium).

At reference numeral 804, a set of control parameters for the fuel cell group are updated based at least in part on the user input (e.g., using the load balancing component 310). The control parameters can include but are not limited to a set of air flow rates for respective fuel cell units included in the fuel cell group (e.g., air flow set-points), a set of fuel flow rates for respective fuel cell units in the fuel cell group (e.g., fuel flow set-points), and/or a set of temperatures for respective fuel cell units in the fuel cell group and/or the fuel cell group (e.g., temperature set-points). For example, a fuel cell group can include six fuel cell units that each produce 200 kW at an optimum air-fuel setting, for a total of 1200 kW. If the user input received at reference numeral 802 includes instructions to take a first fuel cell unit offline, then the set of control parameters for the fuel cell group can be adjusted such that remaining five fuel cell units compensate for the first fuel cell unit. For instance, the set of control parameters can be adjusted to increase the production of the remaining five fuel cell units to 240 kW each (e.g., 1200 kW total) by increasing the fuel flow rate for each of the remaining five fuel cell units.

At reference numeral 806, the updated set of control parameters are implemented (e.g., using the switching component 806). For example, a control parameter regarding fuel flow can be implemented by controlling a fuel flow valve and/or fuel flow pump (e.g., using the fuel set-point component 604) associated with the control parameter, a control parameter regarding air flow can be implemented by controlling an air flow valve and/or air pump (e.g., using the air set-point component 606) associated with the control parameter, and a control parameter regarding temperature control can be implemented by controlling a thermostat and/or a coolant pump (e.g., using the temperature set-point component 608) associated with the control parameter.

FIG. 9 illustrates an example methodology 900 for module level redundancy for fuel cell systems in accordance with various aspects described in this disclosure. At reference numeral 902, a rate of fuel provided from a first fuel source to a first fuel cell unit included in a fuel cell group is managed, regulated, or otherwise controlled (e.g., using the load balancing component 310). The fuel can include but is not limited to natural gas, compressed natural gas (CNG), and/or liquid natural gas (LNG). At reference numeral 904, a rate of fuel provided from a second fuel source to a second fuel cell unit included in the fuel cell group is controlled (e.g., using the load balancing component 310). Providing separate fuel sources for each of the fuel cell units (e.g., the first fuel cell unit and second fuel cell unit) compartmentalizes the fuel cell units, and enables the fuel cell group to provide uninterrupted service to a load in the event of a disruption of a fuel supply, and/or a fuel cell unit going offline or generating less than optimal output.

At reference numeral 906, a determination is made whether the first fuel cell unit included in the fuel cell group is not functioning, out of order, or otherwise offline. For example, the first fuel cell unit may have been taken offline by an operator for maintenance (e.g., using the interface component 504). As an additional or alternative example, the first fuel cell unit or the first fuel source may have experienced a failure causing the first fuel cell unit to be shutdown (e.g., using the alarm component 610). At reference numeral 908, if it is determined that the first fuel cell unit is offline (Y at 904), then a rate of fuel provided (e.g., a fuel flow set-point) to the second fuel cell unit is adjusted to compensate for the first fuel cell unit (e.g., using the load balancing component 310). The fuel cell units operate at an optimal efficiency when provided with a predetermined amount of fuel and/or air (e.g., optimal fuel-air setting). For example, the fuel cell units can each produce 200 kW of electricity at the optimal fuel-air setting. Adjusting the fuel and/or air provided to a fuel cell unit can increase the electrical output of the fuel cell unit. For instance, increasing the fuel provided to a unit may increase the output of the unit (e.g., from 200 kW to 230 kW). Returning to reference numeral 904, if it is determined that the first fuel cell unit is not offline (N at 904), then the methodology returns to reference numeral 902.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various implementations described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various implementations of this disclosure.

Figure 10:
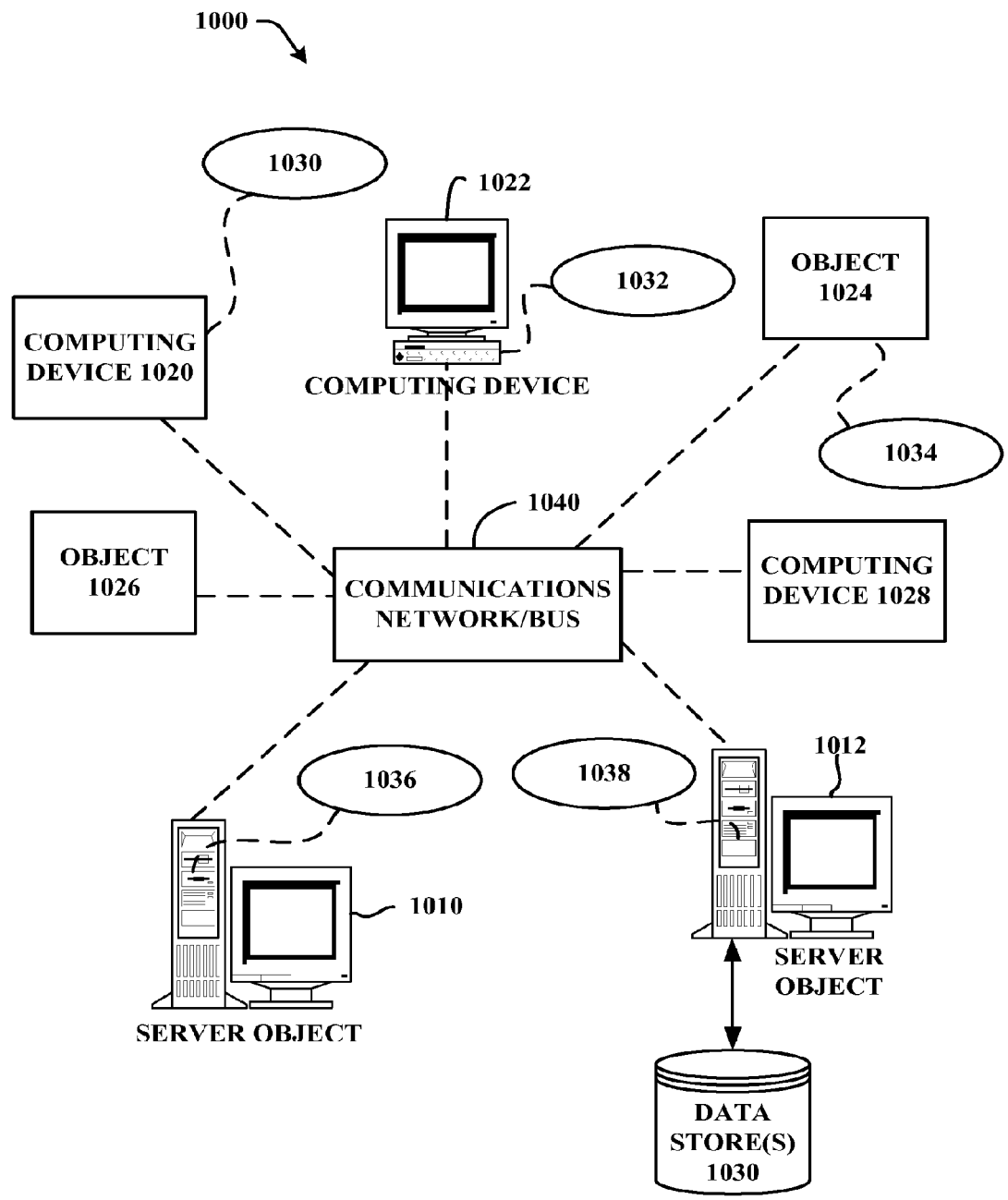
FIG. 10 is a block diagram representing an exemplary non-limiting networked environment in which the various embodiments can be implemented.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038. It can be appreciated that computing objects 1010, 1012, etc. and computing objects or devices 1020, 1022, 1024, 1026, 1028, etc. may comprise different devices, such as personal data assistants (PDAs), audio/video devices, mobile phones, MP3 players, personal computers, tablets, laptops, etc.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1040, either directly or indirectly. Even though illustrated as a single element in FIG. 10, network 1040 may comprise other computing objects and computing devices that provide services to the system of FIG. 10, and/or may represent multiple interconnected networks, which are not shown. Each computing object 1010, 1012, etc. or computing objects or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the various implementations of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various implementations.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc. provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 1040 is the Internet, for example, the computing objects 1010, 1012, etc. can be Web servers with which the client computing objects or devices 1020, 1022, 1024, 1026, 1028, etc. communicate via any of a number of known protocols, such as the hypertext transfer protocol (HTTP). Objects 1010, 1012, etc. may also serve as client computing objects or devices 1020, 1022, 1024, 1026, 1028, etc., as may be characteristic of a distributed computing environment.

Exemplary Computing Device

As mentioned, advantageously, the techniques described herein can be applied to any device suitable for implementing various implementations described herein. Handheld, portable and other computing devices and computing objects of all kinds are contemplated for use in connection with the various implementations, e.g., anywhere that a device may wish to read or write transactions from or to a data store. Accordingly, the below general purpose remote computer described below in FIG. 11 is but one example of a computing device.

Although not required, embodiments can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 11:
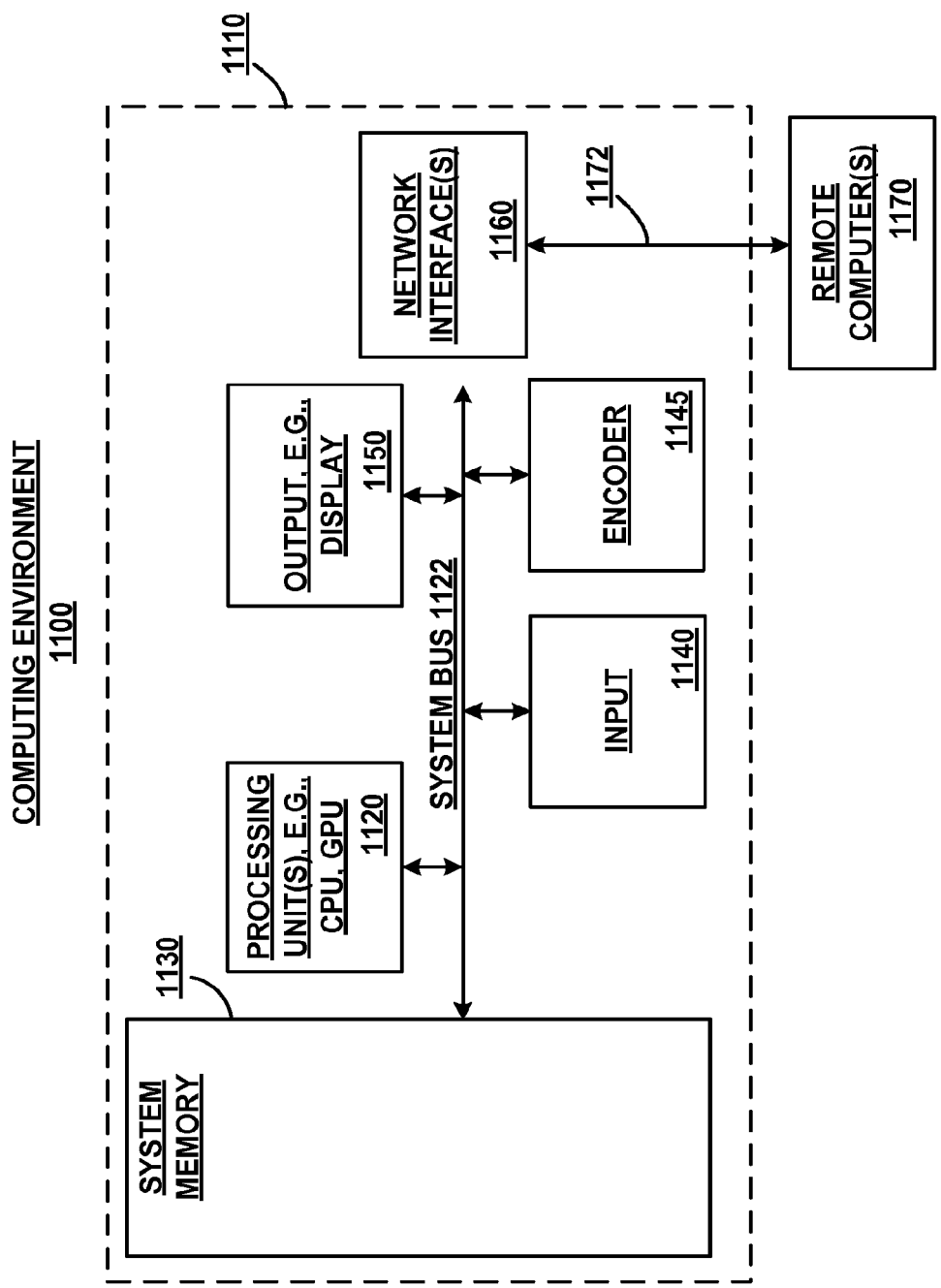
FIG. 11 is a block diagram representing an exemplary non-limiting computing system or operating environment in which the various embodiments may be implemented.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. Neither is the computing environment 1100 be interpreted as having any dependency or requirement relating to any one or combination of components illustrated in the exemplary operating environment 1100.

With reference to FIG. 11, an exemplary remote device for implementing one or more embodiments includes a general purpose computing device in the form of a computer 1110. Components of computer 1110 may include, but are not limited to, a processing unit 1120, a system memory 1130, and a system bus 1122 that couples various system components including the system memory to the processing unit 1120. In one or more implementations, computer 1110 can be used to implement one or more of the systems or components described or shown herein in connection with FIGS. 1-6.

Computer 1110 includes a variety of computer readable media and can be any available media that can be accessed by computer 1110. The system memory 1130 may include computer storage media in the form of volatile and/or nonvolatile memory such as read only memory (ROM) and/or random access memory (RAM). By way of example, and not limitation, memory 1130 may also include an operating system, application programs, other program modules, and program data.

A user can enter commands and information into the computer 1110 through input devices 1140. A monitor or other type of display device is also connected to the system bus 1122 via an interface, such as output interface 1150. In addition to a monitor, computers can also include other peripheral output devices such as speakers and a printer, which may be connected through output interface 1150. An encoder 1145 is also connected to the system bus 1122. The encoder 1145 enables compression and/or decompression of digital data, such as digital video. The encoder 1145 accepts video data in, and converts video data to, virtually any digital format, including but not limited to MPEG-1 and 2 (MPG), QUICKTIME™ (MOV), REALMEDIA™, WINDOWS MEDIA™ (WMV), H.264 (MP4), DIVX™ and Xvid (AVI), FLASH VIDEO™ (FLV), Matroska Multimedia Container (MKV), Theora (OGG), 3GP, Video Object (VOB), and/or WebM™.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such local area network (LAN) or a wide area network (WAN), but may also include other networks/buses. Such networking environments are commonplace in homes, offices, enterprise-wide computer networks, intranets and the Internet.

As mentioned above, while exemplary implementations have been described in connection with various computing devices and network architectures, the underlying concepts may be applied to any network system and any computing device or system in which it is desirable to publish or consume media in a flexible way.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements. Furthermore, reference throughout this disclosure to "one implementation" or "an implementation" or "one embodiment" or "an embodiment" means that a particular feature, structure, or characteristic described in connection with the implementation or embodiment is included in at least one implementation or embodiment. Thus, the appearances of the phrase "in one implementation" or "in an implementation" or "in one embodiment" or "in an embodiment" in various places throughout this specification are not necessarily all referring to the same implementation or embodiment.

Computing devices typically include a variety of media, which can include computer-readable storage media. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various implementations described herein, it is to be understood that other similar implementations can be used or modifications and additions can be made to the described implementation(s) for performing the same or equivalent function of the corresponding implementation(s) without deviating there from. Still further, multiple processing chips or multiple devices can share the performance of one or more functions described herein, and similarly, storage can be effected across a plurality of devices. Accordingly, the invention is not to be limited to any single implementation, but rather can be construed in breadth, spirit and scope in accordance with the appended claims.

What is claimed is:

1. A method implemented by data processing apparatus, the method comprising:
   controlling an amount of fuel provided by a first fuel source to a first cell unit that is included in a fuel cell group, wherein the fuel cell group also includes a second cell unit powered by a second fuel source, and wherein the first fuel source does not provide fuel to other fuel cell units in the fuel cell group, and the second fuel source does not provide fuel to other fuel cell units in the fuel cell group;
   determining, by the data processing apparatus, that the first fuel cell unit is offline; and
   in response to determining the first fuel cell unit is offline, increasing an amount of fuel provided to a second fuel cell unit in the fuel cell group by the second fuel source.

2. The method of claim 1, further comprising:
   determining, by the data processing apparatus, that an output of the first fuel cell unit is less than an output threshold; and
   in response to determining that the output of first fuel cell unit is less than the output threshold, increasing the amount of the fuel provided to the second fuel cell unit.

3. The method of claim 2, wherein the output threshold includes at least one of a fuel cell stack output capacity threshold, a fuel cell unit output capacity threshold, a fuel flow threshold, a fuel cell output capacity threshold, or a fuel cell unit temperature threshold.

4. The method of claim 1, further comprising adjusting an amount of air flow to the second fuel cell unit based, at least in part, on an output of the second fuel cell unit and the amount of fuel provided to the second fuel cell unit.

5. The method of claim 1, wherein the first fuel cell unit and the second fuel cell unit respectively include a first fuel cell stack and second fuel cell stack.

6. The method of claim 5, wherein the first cell stack and the second fuel cell stack respectively include a first gas powered fuel cell and a second gas powered fuel cell.

7. The method of claim 6, wherein the first gas powered fuel cell and the second gas powered fuel cell respectively include a first solid oxide fuel cell and second solid oxide fuel cell.

8. A system, comprising:
   a data processing apparatus; and
   a non-transitory memory storage system in data communication with the data processing apparatus and including instructions executable by the data processing apparatus and that upon such execution cause the data processing apparatus to perform operations comprising:
comprising:
   control an amount of fuel provided by a first fuel source to a first cell unit that is included in a fuel cell group, wherein the fuel cell group also includes a second cell unit powered by a second fuel source, and wherein the first fuel source does not provide fuel to other fuel cell units in the fuel cell group, and the second fuel source does not provide fuel to other fuel cell units in the fuel cell group;

determine, by the data processing apparatus, that the first fuel cell unit is offline; and in response to determining the first fuel cell unit is offline, increase an amount of fuel provided to a second fuel cell unit in the fuel cell group by the second fuel source.

9. The system of claim 8, further comprising:

determining, by the data processing apparatus, that an output of the first fuel cell unit is less than an output threshold; and in response to determining that the output of first fuel cell unit is less than the output threshold, increasing the amount of the fuel provided to the second fuel cell unit.

10. The system of claim 9, wherein the output threshold includes at least one of a fuel cell stack output capacity threshold, a fuel cell unit output capacity threshold, a fuel flow threshold, a fuel cell output capacity threshold, or a fuel cell unit temperature threshold.

11. The system of claim 8, further comprising adjusting an amount of air flow to the second fuel cell unit based, at least in part, on an output of the second fuel cell unit and the amount of fuel provided to the second fuel cell unit.

12. The system of claim 8, wherein the first fuel cell unit and the second fuel cell unit respectively include a first fuel cell stack and second fuel cell stack.

13. The system of claim 12, wherein the first cell stack and the second fuel cell stack respectively include a first gas powered fuel cell and a second gas powered fuel cell.

14. The system of claim 13, wherein the first gas powered fuel cell and the second gas powered fuel cell respectively include a first solid oxide fuel cell and second solid oxide fuel cell.

15. A non-transitory memory storage system storing instructions executable by a data processing apparatus and that upon such execution cause the data processing apparatus to perform operations comprising:

controlling an amount of fuel provided by a first fuel source to a first cell unit that is included in a fuel cell group, wherein the fuel cell group also includes a second cell unit powered by a second fuel source, and wherein the first fuel source does not provide fuel to other fuel cell units in the fuel cell group, and the second fuel source does not provide fuel to other fuel cell units in the fuel cell group;

determining, by the data processing apparatus, that the first fuel cell unit is offline; and in response to determining the first fuel cell unit is offline, increasing an amount of fuel provided to a second fuel cell unit in the fuel cell group by the second fuel source.

16. The non-transitory memory storage system of claim 15, further comprising:

determining, by the data processing apparatus, that an output of the first fuel cell unit is less than an output threshold; and in response to determining that the output of first fuel cell unit is less than the output threshold, increasing the amount of the fuel provided to the second fuel cell unit.

17. The non-transitory memory storage system of claim 16, wherein the output threshold includes at least one of a fuel cell stack output capacity threshold, a fuel cell unit output capacity threshold, a fuel flow threshold, a fuel cell output capacity threshold, or a fuel cell unit temperature threshold.

18. The non-transitory memory storage system of claim 15, further comprising adjusting an amount of air flow to the second fuel cell unit based, at least in part, on an output of the second fuel cell unit and the amount of fuel provided to the second fuel cell unit.

19. The non-transitory memory storage system of claim 15, wherein the first fuel cell unit and the second fuel cell unit respectively include a first fuel cell stack and second fuel cell stack.

20. The non-transitory memory storage system of claim 19, wherein the first cell stack and the second fuel cell stack respectively include a first gas powered fuel cell and a second gas powered fuel cell.

21. The non-transitory memory storage system of claim 20, wherein the first gas powered fuel cell and the second gas powered fuel cell respectively include a first solid oxide fuel cell and second solid oxide fuel cell.

* * * * *